US006923941B2

(12) United States Patent
Huthwohl et al.

(10) Patent No.: US 6,923,941 B2
(45) Date of Patent: Aug. 2, 2005

(54) FILTER ASSEMBLY FOR AN EXHAUST GAS PURIFICATION SYSTEM

(75) Inventors: Georg Huthwohl, Soest (DE); Bernd Maurer, Balve (DE); Bernd Krutzsch, Denkendorf (DE); Günter Wenninger, Stuttgart (DE)

(73) Assignee: PUReM Abgassysteme GmbH & Co. KG, Menden (DE)

( * ) Notice: Subject to any disclaimer, the term of this patent is extended or adjusted under 35 U.S.C. 154(b) by 743 days.

(21) Appl. No.: 09/909,281

(22) Filed: Jul. 19, 2001

(65) Prior Publication Data

US 2002/0021988 A1 Feb. 21, 2002

(30) Foreign Application Priority Data

Jul. 21, 2000 (DE) .......................................... 100 35 544

(51) Int. Cl.$^7$ .......................... B01D 53/34; B01D 50/00; F01N 3/28
(52) U.S. Cl. ........................ 422/177; 422/171; 422/172; 422/181; 55/523; 55/DIG. 30
(58) Field of Search .................................. 422/168–172, 422/177, 180, 181; 55/483, 484, 521, DIG. 30, 523

(56) References Cited

U.S. PATENT DOCUMENTS

| 5,089,237 | A | * | 2/1992 | Schuster et al. ............. 422/180 |
| 5,682,740 | A | * | 11/1997 | Kawamura .................... 60/297 |
| 5,766,455 | A | * | 6/1998 | Berman et al. ............. 210/199 |
| 5,863,311 | A | * | 1/1999 | Nagai et al. .................. 55/483 |
| 6,284,201 | B1 | * | 9/2001 | Buck ........................... 422/177 |

FOREIGN PATENT DOCUMENTS

DE     198 10 738     3/1998

* cited by examiner

Primary Examiner—Hien Tran
(74) Attorney, Agent, or Firm—Collard & Roe, P.C.

(57) ABSTRACT

A filter assembly for an exhaust gas purification system of an internal combustion engine. The filter assembly, has porous filter plate elements, connected with each other on their outer as well as on their inner peripheries, forming in pairs as filter pockets. Catalytic agents such as ammonia are applied to the filter pockets on the outer and/or inner sides to oxidize carbon black contained in the combustion gas. In particular, this filter assembly is compact and can be used for diesel engines of motor vehicles.

20 Claims, 3 Drawing Sheets

FILTER ASSEMBLY FOR AN EXHAUST GAS PURIFICATION SYSTEM

BACKGROUND OF THE INVENTION

1. Field of the Invention

The invention relates to a filter assembly for an exhaust gas purification system of an internal combustion machine. In particular, the invention relates to an internal combustion engine of a motor vehicle, in which filter plate elements are joined with one another both along their outer and inner peripheries, forming pairs of filter pockets.

2. The Prior Art

Such a filter assembly is known in the art and shown in DE 198 10 738 C. The known filter assembly is intended as a particle filter for the combustion gas purification system of an internal combustion engine for a motor vehicle. In particular, this filter assembly oxidizes the carbon black of the exhaust gas of a diesel engine. The filter assembly is formed by using porous filter plates in the form of sintered metal plate rings, which are welded together to form a filter pack comprised of filter pockets. These pockets are located in pairs on the inside and outside in an alternating manner. The filter assembly is catalytically inactive. This assembly can be combined with an oxidation catalyst and/or a catalyst for reducing the nitrogen oxide. This system enlarges the space required for installing the exhaust gas purification system.

The invention creates a filter assembly of the type specified above that permits carbon black oxidation and/or the reduction of nitrogen oxides in addition to the filtering of the carbon black particles.

The catalyzing agents are associated with the filter pockets on the outer and/or the inner sides. The catalytic functions are integrated in the filter assembly in addition to the filtration effect. In particular, there is a particle filter, so that the filter assembly represents a multifunctional device. In contrast to the prior art, the additional catalyst functions are performed without having to enlarge the volume or space required for the installation of the combustion gas purification system. This results in an extremely space-saving yet functional solution. The filter plate elements are created as dish-like elements and have a central passage, so that they have the shape of a ring.

The catalyst agents are created in the form of catalytically active foils. This represents a form of catalyst that is particularly simple and functions in a safe manner. The foils are preferably rotationally symmetrical in relation to the longitudinal axis of the filter elements, which shape is analogous to the filter plate elements. However, neither the foils nor the filter plate elements are limited to the rotation-symmetrical design, and may be shaped with corners or in some other suitable way.

In another embodiment of the invention, the foils have filter plate elements on the inwardly and outwardly disposed apexes of the filter pockets. These foils project down into the outer or inner filter pockets, in a radial manner in relation to the center axis of a filter pocket. The foils are in direct contact with the filter plate elements only within the zone of the apexes. There is nearly no rise in the combustion gas counterpressure when the filter assembly is in operation, because the foils do not represent any additional obstacle. These foils exert almost no influence on the stream of exhaust because they are located in the free space of the filter pockets.

In another embodiment of the invention, the foils have a stiffening structure. This prevents the foils from starting to flutter during the operation of the filter assembly because of the flow of exhaust gas and in particular, as a result of pressure-induced pulses caused by the flow of the combustion gas. The foils in particular have a suitable embossing for stiffening their structure.

In another embodiment of the invention, the foils are fixed in their radial alignment by the filter pockets having a supporting means. The foils are supported on part of the filter plate elements by using a suitable supporting means. In particular, the filter plate rings can have a napped structure serving as the supporting means. This napped structure supports the foils in the form of disks or disk rings over their entire surface area or in points over part of the surface.

In another embodiment of the invention, at least some of the foils have a coating that acts as an oxidation catalyst. This part of the foils is fixed on the apexes of the filter pockets located on the inner side to achieve the catalyst function on the inlet side. It is possible to oxidize carbon black contained in the combustion gas, which is preferable especially in conjunction with diesel engines. In the same manner, the foils may also be connected with the filter plate elements on the apexes located on the outer sides. These foils are then cantilevered inwards and thus mounted on the outlet side where the exhaust gas flows from the outside to the inside. The oxidation of carbon black is not promoted in this manner. However, the oxidation of HC and CO present in the combustion gas is enhanced because no deposits of carbon black or other solid particles are present on the foil on the outlet side. Thus, it is possible to achieve enhanced activity of the catalyst effect.

In yet another embodiment of the invention, at least some of the foils are actively coated with a catalyst material supporting the reduction of nitrogen oxide. In this case, the coated foils can be positioned both on the inlet and outlet sides of the stream of the combustion gas. Thus, the foils can be positioned both in the filter pockets that are open outwardly and in those that are open inwardly.

In another embodiment of the invention, metering agents such as ammonia are associated with the foils for feeding a reducing agent. In particular, feed channels are integrated in the filter assembly, serving as metering means that assure that the ammonia is injected in suitable feeding sites.

In yet another embodiment of the invention, sections of the feed channels are integrated in the filter plate elements in the form of suitably embossed structures, wherein these flow channels form one piece with the embossed structures. In this way, the metering channels are at least partially received in the filter plate elements. This is an arrangement that can be produced in a simple manner and does not require any additional structural components.

BRIEF DESCRIPTION OF THE DRAWINGS

Other objects and features of the present invention will become apparent from the following detailed description considered in connection with the accompanying drawing which discloses several embodiments of the present invention. It should be understood, however, that the drawing is designed for the purpose of illustration only and not as a definition of the limits of the invention.

DETAILED DESCRIPTION OF PREFERRED EMBODIMENTS

Figure 1:
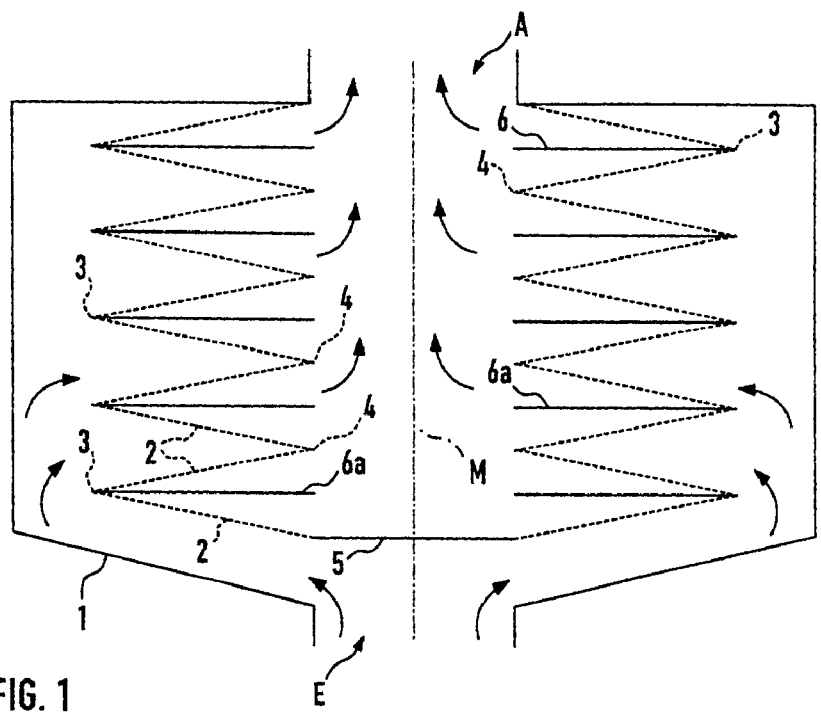
FIG. 1 is a schematic representation showing a longitudinal sectional view of a filter assembly, with catalytically active foils arranged on the outlet side.

Referring to FIGS. 1 to 6, filter assembles are shown that have exhaust gas purification systems intended for internal combustion engines of motor vehicles. All filter assemblies according to FIGS. 1 to 6 each comprise a filter housing 1, having a packet comprised of the ring-shaped filter plates 2. Both filter housing 1 and the packet comprised of ring-shaped filter plates 2 are rotationally symmetrical in relation to a longitudinal center axis "M" of the filter assembly. Filter housing 1 has an inlet "E" for the flow of exhaust gas to be purified. In addition, housing 1 has an outlet "A" located at its opposite end for the purified stream of exhaust gas. In all exemplified embodiments according to FIGS. 1 to 5, the course of the flow of exhaust gas is visually shown by respective arrows, whereby the arrows only symbolically represent defined partial streams. It is clear however, that all the purified streams flows through filter plate rings 2 within filter housing 1 in a corresponding manner.

Filter plate rings 2 are porous to assure the flow-through of the stream of combustion gas. In the exemplified embodiment, filter plate rings 2 are formed as sintered metal plates shaped as dishes. Filter plate rings 2 each are assembled in pairs to create filter pockets between each two adjacent filter plate rings that are disposed on the outside and inside. Filter plate rings 2 are connected with each other in a fixed way all the way around, both in the zone of the outer apexes, or outer edges 3 of the filter pockets, and in the zone of their inner apexes 4, or inner edges. The end-side filter plate rings 2 positioned in the area of outlet "A" are connected with their inner apexes, i.e. their inner edges, with the inner side of the filter housing 1, notably in a fixed manner by welding.

The permeability of filter plate rings 2, results from the use of porous sintered metal plates, is illustrated by the dashed representation of filter plate rings 2. Filter plate ring 2 located adjacent to the inlet "E" is closed in the area of its inner passage by a baffle plate 5. Thus, the flow of combustion gas entering filter housing 1 is deflected in all directions in a radial manner in relation to the longitudinal center axis "M" as shown by the arrows. Subsequently, the flow of exhaust gas penetrates each one of filter plate rings 2 from the outside to the inside, as shown by the arrows. From the interior of the packet comprised of the filter plate rings, the flow of combustion gas is then passed to outlet "A".

Because filter plate rings 2 are porous, the stream of exhaust gas that flows in a radial manner through filter plate rings 2 from the outside to the inside, causes a filtration effect. Thus, solid particles contained in the stream of exhaust gas, such as carbon black particles, settle on the outer walls of filter plate rings 2 and consequently in the zone of the filter pockets located on the outer side.

The basic filtering function of the filter assemblies according to FIGS. 1 to 6, are similar to German Patent DE 198 10738C1 incorporated herein by reference.

Filter assemblies 1 shown in FIGS. 1 to 6 additionally perform catalyst functions as well. The catalytically active foils 6, 6a, 6b are associated with the filter pockets formed by filter plate rings 2. The structure and function of these foils are described in greater detail with the help of the individual exemplified embodiments. Foils 6, 6a and 6b each have the shape of a disk-like ring and, are tied in between each two adjacent filter plate rings 2 within the area of the inner or outer apexes 3, 4 of the packet of filter plate rings 2. Foils 6 are preferably made of metal foil material and have a catalytically active coating. Foils 6 may be welded in between filter plate rings 2. In addition, foils 6 are aligned in a radial manner in relation to the longitudinal center axis "M" and project into the center of the filter pockets disposed on the inside or outside. These filter pockets have a three-cornered cross section. Therefore, foils 6, 6a, 6b are each joined with filter plate rings 2 in a fixed manner, only in zone of respective apexes 3, 4. Otherwise foils 6 freely project into the associated filter pocket.

In a manner not shown in greater detail, foils 6, 6a and 6b have a stiffening structure in the form of ribs, bridges or embossed structures, which increases the stiffness of respective foils 6, 6a and 6b. In a manner also not shown in greater detail, filter plate rings 2 may have nap-like structures projecting into the associated filter pockets. These nap-like structures support foils 6, 6a, 6b from both sides at least partially in points. The naps are aligned at right angles in relation to foils 6, and engage each foil 6, 6a, 6b from both sides.

Figure 2:
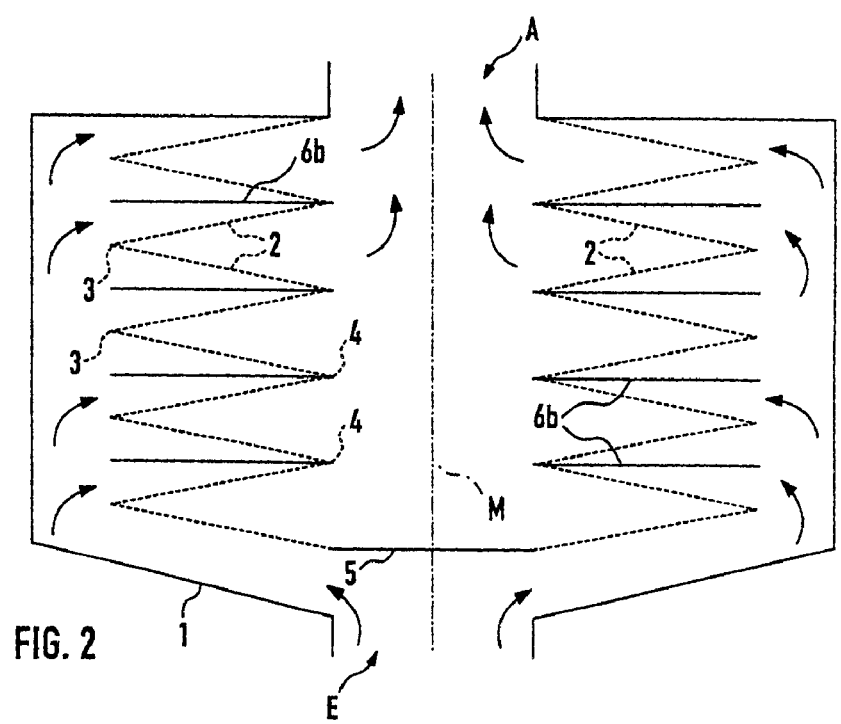
FIG. 2 shows an embodiment similar to the one represented in FIG. 1, but with catalytically active foils arranged on the inlet side.

Filter assemblies 1 according to FIGS. 1 and 2, include the oxidation-catalytically actively coated foils 6, 6a, 6b, which are located on the inner side, and thus on the outlet side of filter plate rings 2. In the embodiment according to FIG. 2, these foils are located on the outer side, and thus on the inlet side of filter plate rings 2. In the arrangement of FIG. 1, where foils are located on the outlet side, oxidation of HC and CO occurs in the stream of exhaust gas, whereby the surface of foils 6a is not impaired in its activity by deposits, because these deposits are trapped on filter plate rings 2 on the outer side, such as the exhaust gas inlet side.

Foils 6b are arranged on the outer side, i.e. on the exhaust gas inlet side. These foils oxidize carbon black particles within the stream of combustion gas, so that the deposits of such particles take place on foils 6b. This deposit prevents filter plate rings 2 from being loaded with carbon black deposits, or become so loaded only to a lesser extent.

Figure 3:
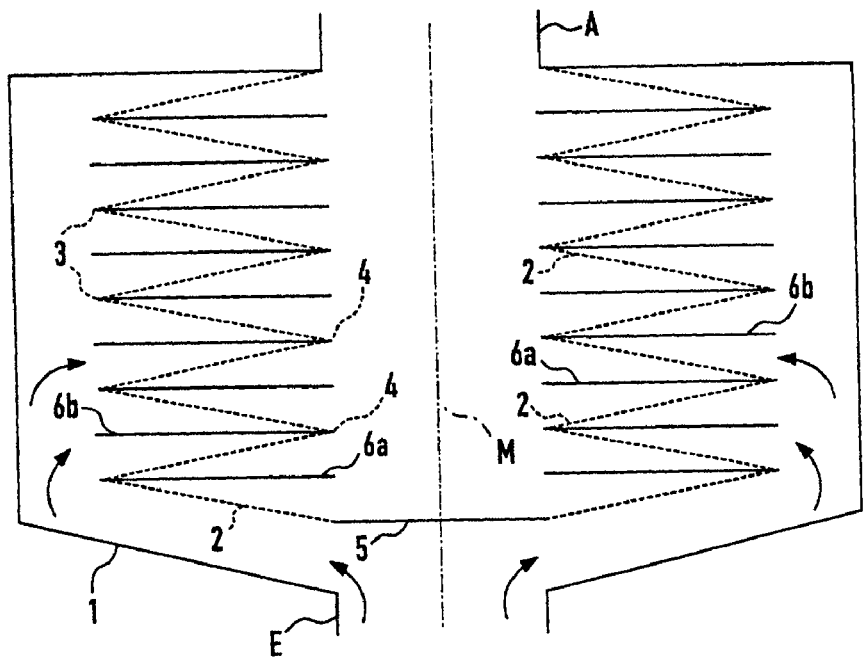
FIG. 3 shows a further embodiment of the invention, wherein catalytically active foils are present on both the inlet and outlet sides.

In the embodiment according to FIG. 3, the surface area of the catalyst is doubled in that the oxidation-catalytically active foils 6a, 6b are arranged in the zone of all filter pockets. For example, the active foils are arranged in the filter pockets both on the inlet and outlet sides of filter plate rings 2, thereby achieving with outer foils 6b, the functions and advantages of the embodiment according to FIG. 2. Inner foils 6a provide the advantages and functions of the embodiment according to FIG. 1.

Figure 4:
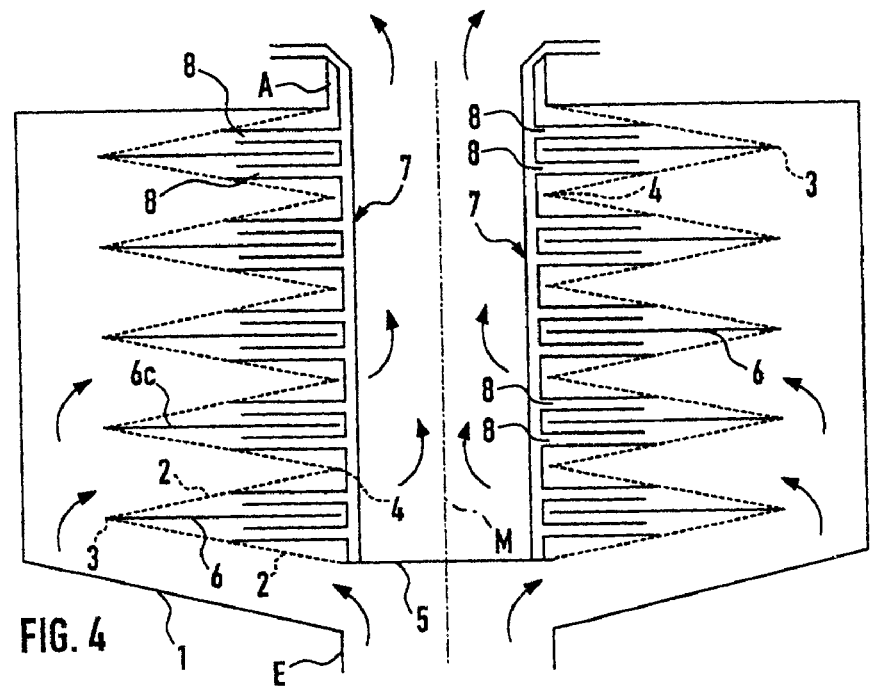
FIG. 4 shows another embodiment of a filter assembly, wherein there is a metering means for feeding a reducing agent associated with catalytically active foils arranged on the outlet side.
Figure 5:
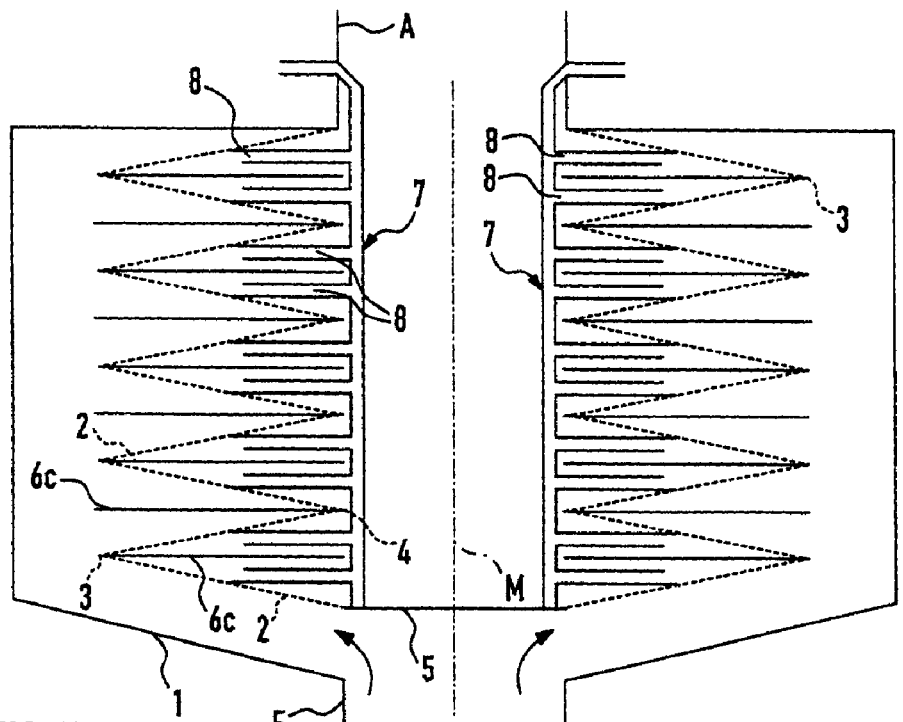
FIG. 5 shows an embodiment of a filter assembly as defined by the invention that is similar to the one shown in FIG. 4, wherein there are catalytically active foils on the inlet side.
Figure 6:
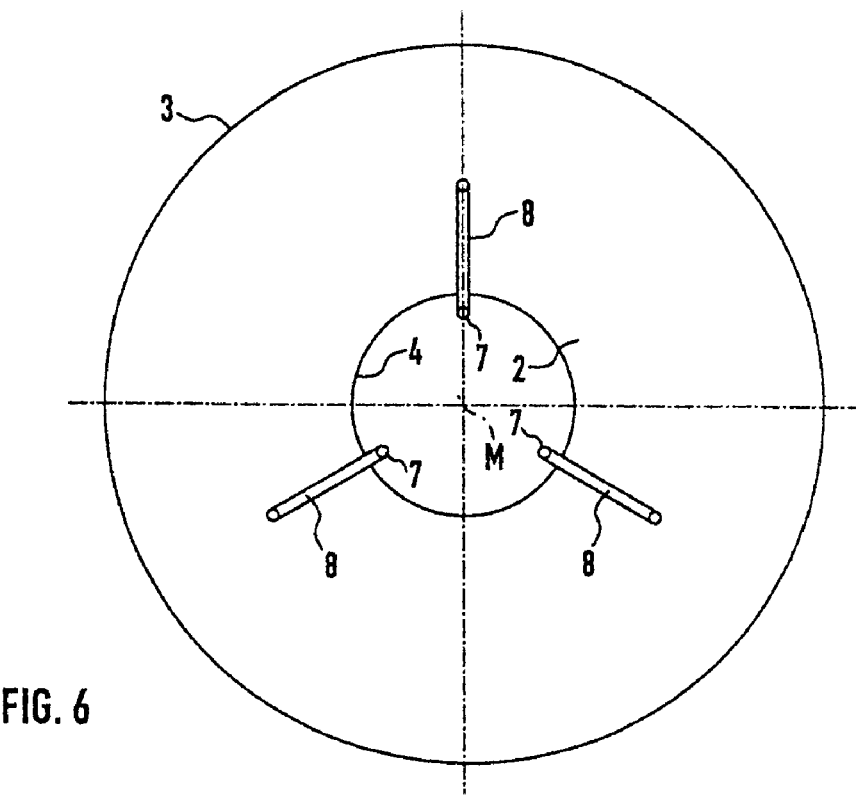
FIG. 6 shows by a front-side view the star-shaped arrangement of the metering means located within the area of a filter plate ring of the filter assembly according to FIG. 4 or FIG. 5.

In the embodiment according to FIG. 4, the filter assembly in filter housing 1 comprises catalytically actively coated foils 6c, which reduce nitrogen oxides. The catalytically active foils according to FIGS. 4 and 5, which are active with respect to the reduction of nitrogen oxide, have reference symbol 6c to illustrate the difference versus the oxidation-catalytically active foils 6, 6a, 6b. Foils 6c project into the inner filter pockets, and are thus arranged on the outlet side. A metering means is used to supply foils 6c with a reducing agent such as ammonia. These metering means permit the injection of ammonia. For this purpose, channel sections 7 (FIG. 6) are uniformly distributed over the circumference, and extend parallel with the longitudinal center axis "M". These channel sections have branches on both sides of each foil 6c in the form of nozzle channel 8 cantilevering outwards in a radial manner.

The catalytically active foils may be arranged also on the inlet side of filter plate rings 2. According to FIG. 5, it is also possible to make twice the number of foils to double the catalytically active surface area.

In addition, it is also possible to combine the foils that are catalytically active with respect to nitrogen oxide reduction, with foils that are catalytically active with respect to oxidation, and to arrange these foils in the zone of the filter pockets on the outer and/or inner sides.

Accordingly, while only a few embodiments of the present invention have been shown and described, it is to be understood that many changes and modifications may be made thereunto without departing from the spirit and scope of the invention as defined in the appended claims.

What is claimed is:

1. A filter assembly for an exhaust gas purification system of an internal combustion engine of a motor vehicle comprising:
    (a) a plurality of filter plate elements arranged alternately parallel to each other and coupled to each other on their outer and inner periphery thereby forming in pairs, a plurality of filter pockets, said plurality of filter pockets having outer and inner sides and outer and inner apexes and being arranged one after another in a main direction of an exhaust gas flow; and,
    wherein said plurality of filter plate elements which are formed as sintered metal filter plate rings are shaped as dishes;
    (b) a plurality of catalytic agents with at least one catalytic agent associated with at least one side of said at least one of said plurality of filter pockets.

2. The filter assembly as in claim 1, wherein said plurality of filter plate elements have a central passage.

3. The filter assembly as in claim 1, wherein said plurality of catalytic agents are associated with said outer sides of said plurality of filter pockets and act as an oxidation catalyst.

4. The filter assembly as in claim 2, wherein said plurality of catalytic agents are associated with said outer sides of said plurality of filter pockets and act as an oxidation catalyst.

5. The filter assembly as in claim 1, wherein said plurality of catalytic agents are associated with said inner sides of said plurality of filter pockets and comprise a catalyst material supporting the reduction of nitrogen oxide.

6. The filter assembly as in claim 2, wherein said plurality of catalytic agents are associated with said inner sides of said plurality of filter pockets and comprise a catalyst material supporting the reduction of nitrogen oxide.

7. The filter assembly as in claim 3, wherein said plurality of catalytic agents are associated with said inner sides of said plurality of filter pockets and comprise a catalyst material supporting the reduction of nitrogen oxide.

8. The filter assembly as in claim 4, wherein said plurality of catalytic agents are associated with said inner sides of said plurality of filter pockets and comprise a catalyst material supporting the reduction of nitrogen oxide.

9. The filter assembly as in claim 3, wherein said plurality of catalytic agents are catalytically active foils coupled to at least one of said plurality of filter plate elements on said inner apexes and project into said outer side of said plurality of filter pockets.

10. The filter assembly as in claim 4, wherein said plurality of catalytic agents are catalytically active foils coupled to at least one of said plurality of filter plate elements on said inner apexes and project into said outer side of said plurality of filter pockets.

11. The filter assembly as in claim 5, wherein said plurality of catalytic agents are catalytically active foils coupled to at least one of said plurality of filter plate elements on said outer apexes and project into said inner side of said plurality of filter pockets.

12. The filter assembly as in claim 6, wherein said plurality of catalytic agents are catalytically active foils coupled to at least one of said plurality of filter plate elements on said outer apexes and project into said inner side of said plurality of filter pockets.

13. The filter assembly as in claim 7, wherein said plurality of catalytic agents are catalytically active foils coupled to at least one of said plurality of filter plate elements on said inner and outer apexes and project into said outer and inner sides of said plurality of filter pockets.

14. The filter assembly as in claim 8, wherein said plurality of catalytic agents are catalytically active foils coupled to at least one of said plurality of filter plate elements on said inner and outer apexes and project into said outer and inner sides of said plurality of filter pockets.

15. The filter assembly as in claim 9, wherein said catalytically active foils have a metering means for feeding a reducing agent.

16. The filter assembly as in claim 10, wherein said catalytically active foils have a metering means for feeding a reducing agent.

17. The filter assembly as in claim 11, wherein said catalytically active foils have a metering means for feeding a reducing agent.

18. The filter assembly as in claim 12, wherein said catalytically active foils have a metering means for feeding a reducing agent.

19. The filter assembly as in claim 13, wherein said catalytically active foils have a metering means for feeding a reducing agent.

20. The filter assembly as in claim 14, wherein said catalytically active foils have a metering means for feeding a reducing agent.

* * * * *